United States Patent [19]

Kubo

[11] Patent Number: 5,760,985
[45] Date of Patent: Jun. 2, 1998

[54] ERASING DEVICE

[75] Inventor: Ryoji Kubo, Tokyo, Japan

[73] Assignee: Canon Kabushiki Kaisha, Tokyo, Japan

[21] Appl. No.: 468,572

[22] Filed: Jun. 6, 1995

Related U.S. Application Data

[63] Continuation of Ser. No. 408,187, Mar. 22, 1995, abandoned, which is a continuation of Ser. No. 169,758, Dec. 20, 1993, abandoned, which is a continuation of Ser. No. 931,421, Aug. 24, 1992, abandoned, which is a continuation of Ser. No. 553,667, Jul. 18, 1990, abandoned.

[30] Foreign Application Priority Data

Jul. 18, 1989 [JP] Japan ................... 1-184978

[51] Int. Cl.$^6$ ................... G06F 11/00
[52] U.S. Cl. ................... 360/66
[58] Field of Search ................... 360/66

[56] References Cited

U.S. PATENT DOCUMENTS 4,670,799  6/1987  Ogura et al. ................... 360/66
4,740,846  4/1988  Ogawa ................... 360/66
4,814,904  3/1989  Shigihara et al. ................... 360/66
4,939,598  7/1990  Kulakowski ................... 360/66
5,043,831  8/1991  Muramoto et al. ................... 360/66

*Primary Examiner*—Vincent P. Canney
*Attorney, Agent, or Firm*—Fitzpatrick, Cella, Harper & Scinto

[57] ABSTRACT

There is provided an erasing device for erasing the recorded signal in each recording block on a recording medium such as a still video floppy which can individually record the signal into each of the recording blocks. The erasing device comprises: a discriminating circuit to discriminate a recording state of each recording block; an erasing circuit to generate an erasing signal; and a controller to control the erasing circuit in accordance with the result of the discrimination of the discrimination circuit. With this device, a state in which the memory area on the medium is erased can be obtained in a short time using little energy.

5 Claims, 6 Drawing Sheets

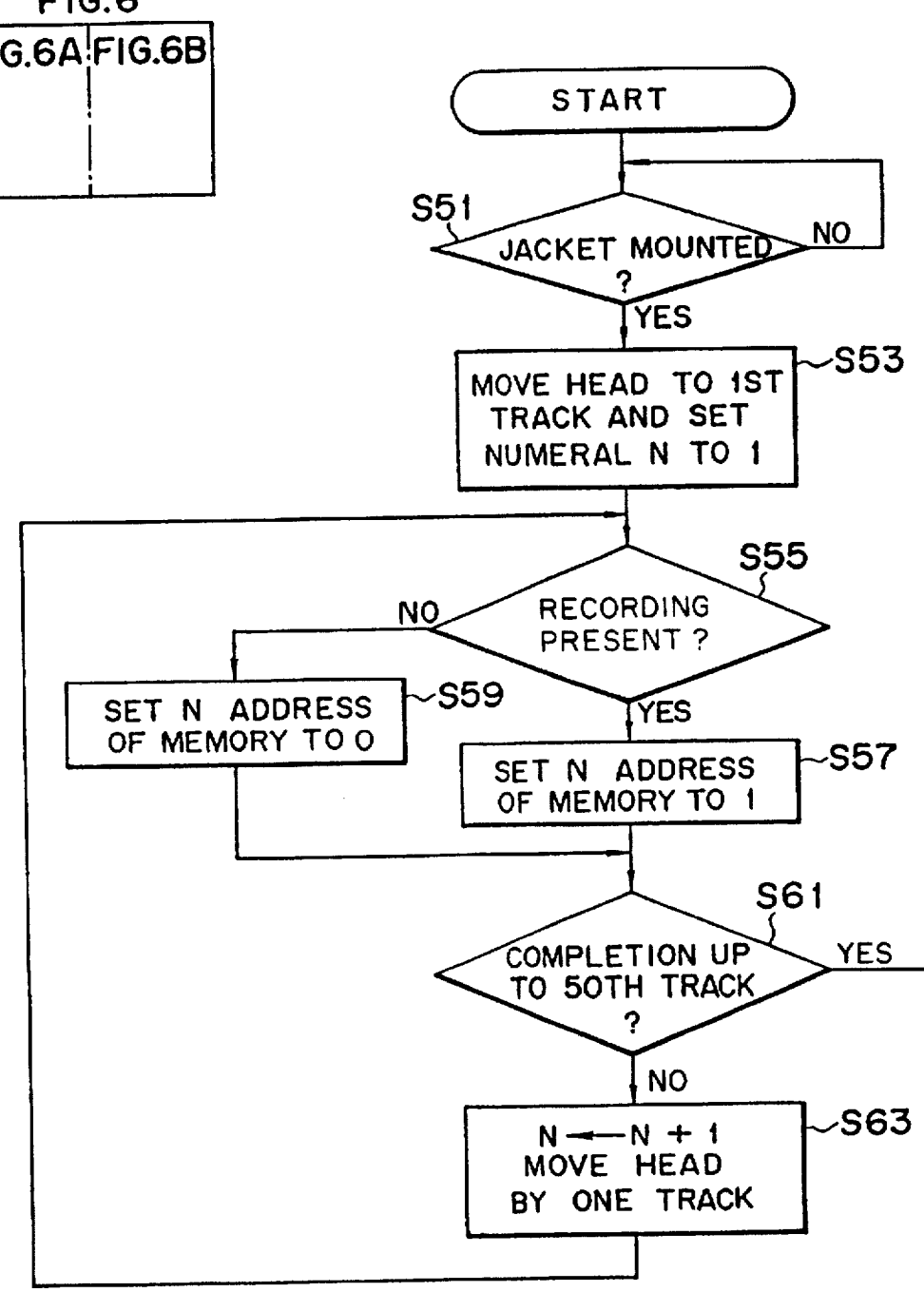

ERASING DEVICE

This application is a continuation of prior application, Ser. No. 08/408,187 filed Mar. 22, 1995, which application is a continuation of prior application, Ser. No. 08/169,758 filed Dec. 20, 1993, which application is a continuation of prior application, Ser. No. 07/931,421 filed Aug. 24, 1992, which application is a continuation or prior application, Ser. No. 07/553,667 filed Jul. 18, 1990, all now abandoned.

BACKGROUND OF THE INVENTION

1. Field of the Invention

The present invention relates to an erasing device and, more particularly, to an erasing device of a recording medium such as a still video floppy which has a plurality of recording blocks and can individually record a still image into each of the recording blocks.

2. Related Background Art

As such a recording medium of still images, there is known a still video floppy specified in the Still Video Conference. The still video floppy is used as an image recording medium of a still video camera. The still video camera has the erasing function to erase unnecessary recording images. As an erasing procedure, there can be mentioned a method whereby a magnetic head is moved to an arbitrary track to be erased and an erasing current is applied to the magnetic head in accordance with a predetermined switch operation and the signal of the relevant track is erased or a method whereby the signals of all of the tracks are sequentially erased in accordance with the order from the first track on the outermost rim track side to the 50th track on the innermost rim track side in accordance with a predetermined switch operation (what is called a full track erase mode).

In the still video floppy, fifty tracks from the first outermost rim track to the 50th innermost rim track are provided and a video signal of one field can be recorded into each track. Two adjacent tracks are used to record the video image of one frame. On the other hand, as identification information which is provided in association with the still image to be recorded, that is, as ID information, a recording format such as date, time, track number, field/frame ID information, user's code, and the like is specified.

In the conventional example, even in the full track erase mode, the magnetic head is positioned to all of the tracks and the erasing current is applied to the magnetic head. Therefore, for instance, even in the magnetic disk in which the signals were recorded to only a few tracks, substantially the same time and the same electric power consumption as those in the case of the magnetic disk in which the signals were recorded in all of the tracks are consumed. Such a drawback results in a problem in which the life of the battery is unnecessarily reduced in the case of the device using a battery as a power source.

There is also a problem such that in the case where it takes a predetermined time to erase each track, the time necessary for erasure is long.

SUMMARY OF THE INVENTION

It is an object of the present invention to provide an erasing device which can solve individually or all of the above-mentioned problems.

Another object of the invention is to provide an erasing device which can erase a memory area on a medium with little energy.

Still another object of the invention is to provide an erasing device which can obtain in a short time a state in which a memory area on a medium was erased.

Under the above objects, according to a preferred embodiment of the invention, there is provided an erasing device for erasing a recording signal in each block of a recording medium which can individually record signals into respective recording blocks, comprising: discriminating means for discriminating a recording state of each of the recording blocks; an erasing circuit to generate an erasing signal; and control means for controlling the erasing circuit in accordance with the result of the discrimination of the discriminating means.

Another object of the invention is to provide a device which can certainly erase the unnecessary recording blocks.

The above and other objects and features of the present invention will become apparent from the following detailed description and the appended claims with reference to the accompanying drawings.

BRIEF DESCRIPTION OF THE DRAWINGS

FIGS. 6, 6A and 6B are flowchart of the embodiment.

DETAILED DESCRIPTION OF THE PREFERRED EMBODIMENTS

An embodiment of the invention will be described hereinbelow with reference to the drawings.

Figure 1:
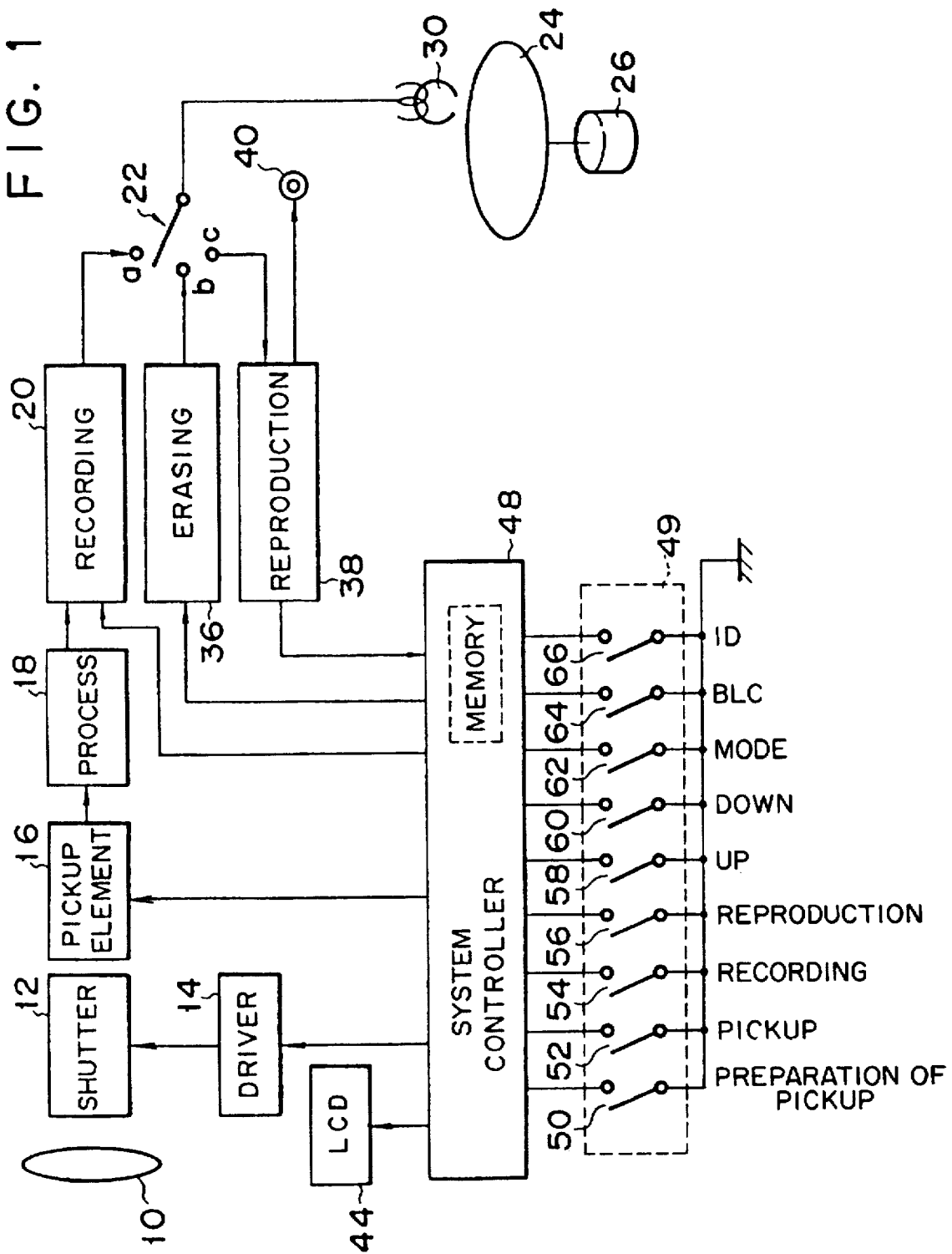
FIG. 1 is a constructional block diagram of an embodiment of the invention.

FIG. 1 is a block diagram showing a construction of an embodiment of the invention. Reference numeral 10 denotes an image pickup lens; 12 a mechanical shutter; 14 a driver of the shutter 12; 16 an image pickup element; 18 a processing circuit to form a luminance signal and color difference signals from an output of the image pickup element 16; 20 a recording circuit to execute recording processes such as a modulation and the like to the luminance signal and the color difference signals which are output from the processing circuit 18; 22 a change-over switch to switch the recording, erasing, and reproduction modes; 24 a still video floppy as a recording medium; 26 a motor to rotate the floppy 24; 30 a magnetic head; 36 an erasing circuit to generate an erasing signal; 38 a reproduction circuit for executing reproducing processes such as a demodulation and the like to a reproduction signal from the magnetic head 30 and outputting the processed signal in a video signal format; and 40 a video output terminal.

Reference numeral 44 denotes a liquid crystal display apparatus to display a state of the system and various data; 48 indicates a system controller to control the whole system; and 49 switches each for inputting a predetermined instruction to the system controller 48. A switch 50 for preparation of the image pickup operation is closed by the first stroke of a releasing operation of a shutter and instructs to set the system into the image pickup preparation mode. An image pickup switch 52 is closed by the second stroke of the shutter releasing operation and instructs the image pickup operation. There are also provided: a recording switch 54; a reproduction switch 56; an up switch 58 to instruct the track-up operation; a down switch 60 to instruct the track-down operation; a mode switch 62 to switch the display mode of the LCD apparatus 44 and to switch the setting mode; a BLC switch 64; and an ID switch 66. In the embodiment, when all three of the BLC switch 64, mode switch 62, and pickup preparation switch 50 are simultaneously turned on, the system is set into the full track erase mode. For instance, when the BLC switch 64 and the pickup preparation switch 50 are simultaneously turned on, only the track which is being accessed by the head is erased.

The operation in the recording mode will now be simply described. An optical image of an object is converted into an electric signal by the image pickup element 16. The processing circuit 18 outputs the luminance signal and the color difference signals. The recording circuit 20 executes processes such as a modulation and the like for recording to the luminance signal and the color difference signals from the processing circuit 18. An output of the recording circuit 20 is supplied to the magnetic head 30 through the switch 22 and recorded into the floppy 24.

The operation in the reproduction mode will now be described. The system controller 48 is set into the reproduction mode in accordance with the operation of the reproduction switch 56 in the switch group 49 and connects the switch 22 to the c contact. An output of the magnetic head 30 is supplied to the reproduction circuit 38. The video signal reproduced by the reproduction circuit 38 is output to the output terminal 40.

Figure 2:
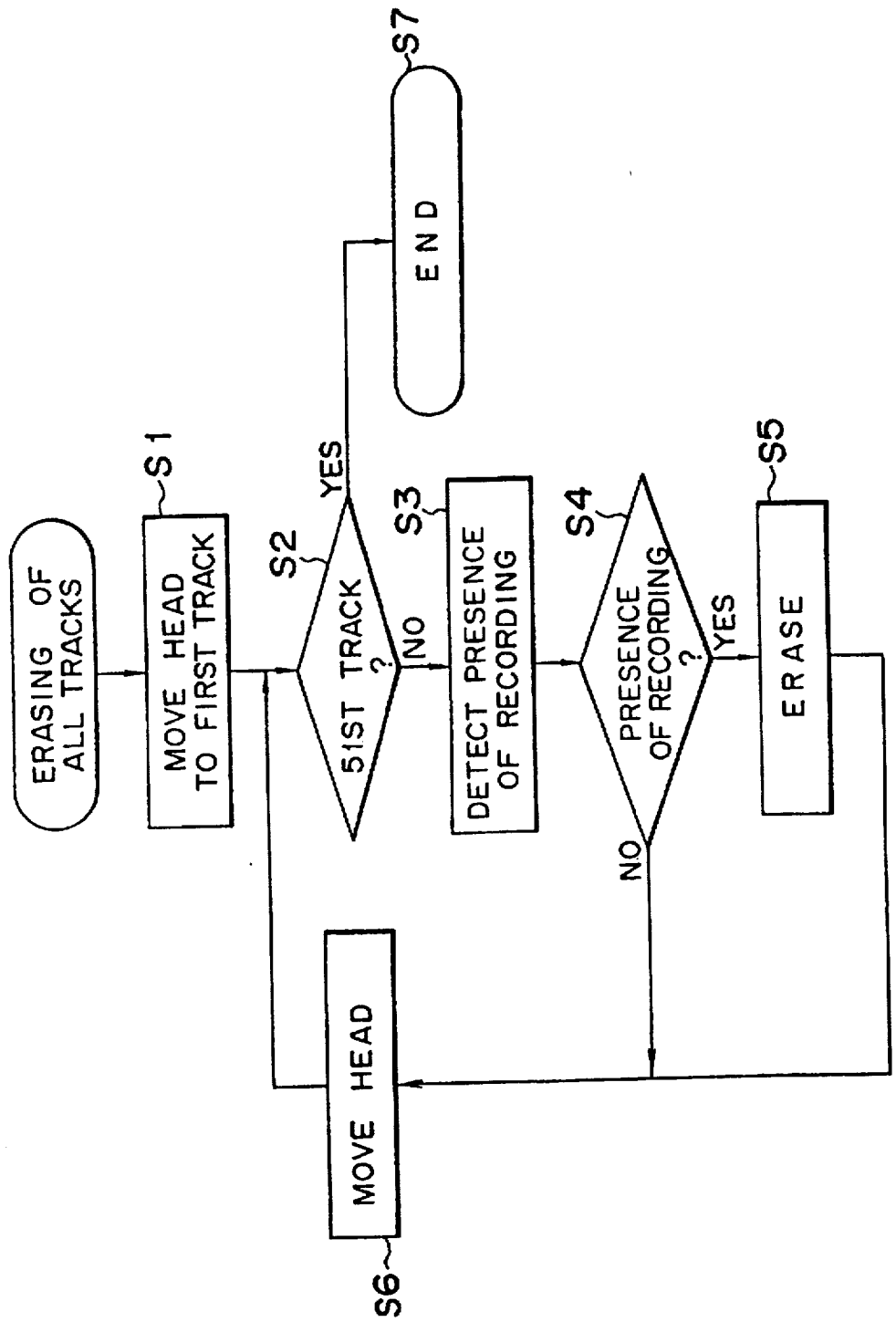
FIG. 2 is an operation flowchart of the embodiment.

The operation in the full track erase mode will now be described with reference to FIG. 2. The reproduction switch 56 is turned on to set the system into the reproduction mode. During the reproduction of an arbitrary track, the BLC switch 64, mode switch 62, and pickup preparation switch 50 are simultaneously turned on, so that the system is set into the full track erase mode. First, the magnetic head is moved to the first track (S1) and the presence or absence of the recorded signal is checked (S3). If the first track has the recorded signal, an erasing current is generated by activating the erasing circuit 36 and the erasing current is applied to the magnetic head 30 through the switch 22 (S5). If no signal is recorded in the first track (S4) and after completion of the erasing operation (S5), the magnetic head 30 is moved to the next track (S6). A check is made to see if the signal has already been recorded or not in the track to which the head was moved and the erasing operation is executed (S3, S4, S5). If the track to which the head was moved is the 51st track, this means that all of the tracks have completely been erased. Therefore, the processing routine in the full track erase mode is finished (S2).

The presence or absence of the recorded signal in each track is detected by the reproduction circuit 38. Such a detection is executed when the magnetic disk 24 is loaded. The result of the discrimination regarding the presence or absence of the recorded signal in each track is stored into a memory (not shown) in the system controller 48. In step S3, the memory data in the memory also can be used. The above flow will be described hereinafter after reference to FIG. 6.

In the embodiment, the presence or absence of the recorded signal is discriminated and if it is determined that the recorded signal exists in accordance with the result of the discrimination, the erasing operation is executed. However, the erase mode also can be switched in accordance with a degree of the discrimination regarding the presence or absence of the recorded signal. That is, if it is determined that the recorded region is the region where the signal was recorded by a strong magnetic field, the erasing intensity also may be continuously changed so as to give a strong erasing signal of more energy.

Figure 3:
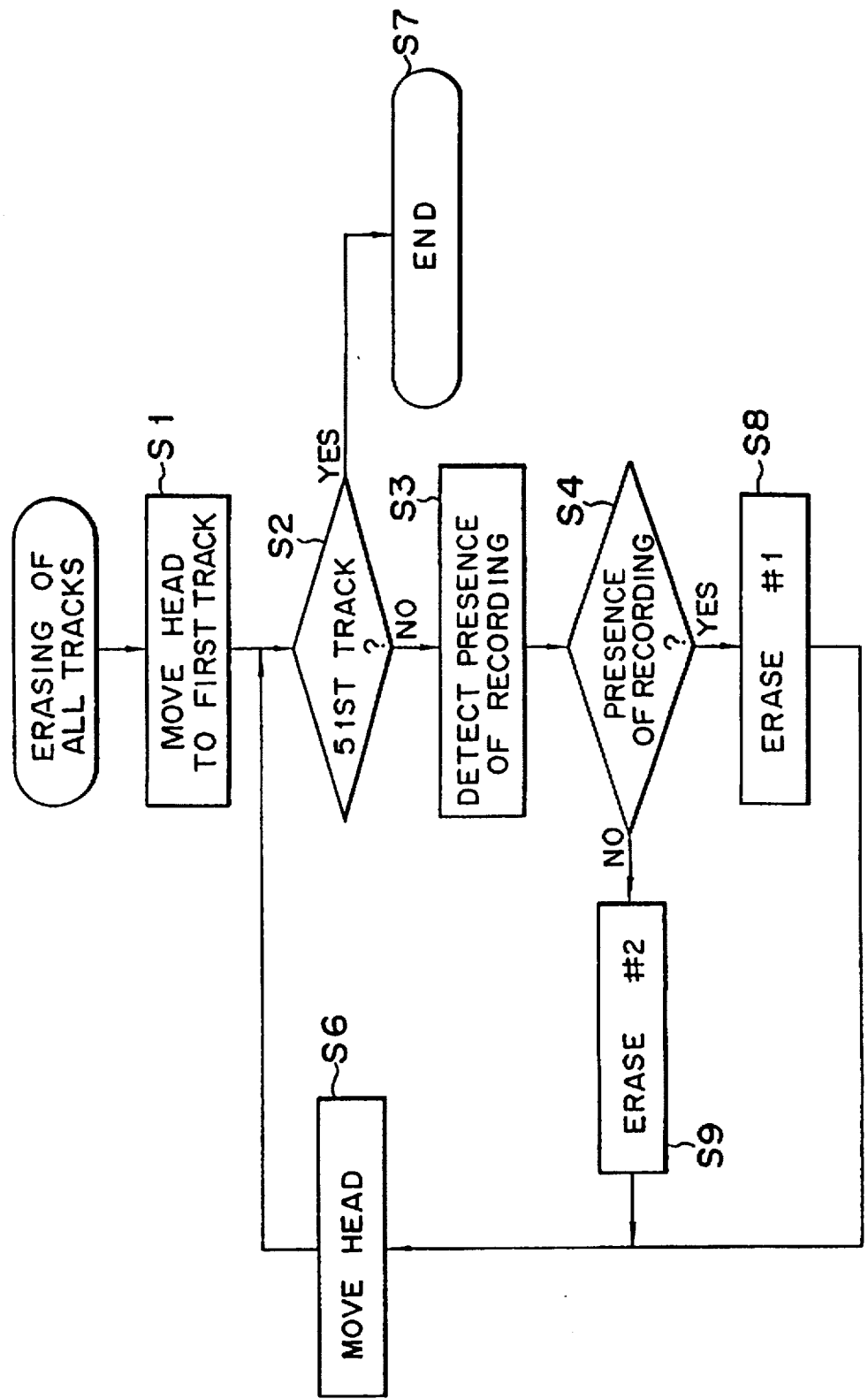
FIG. 3 is another operation flowchart.

FIG. 3 shows another operation flowchart of the embodiment. In the embodiment, a first attenuation wave is output as an erasing current from the erasing circuit 36 to the recorded track (S8). A second attenuation wave of an attenuation amount which is larger than (for instance, which is twice as large as) the first attenuation wave is output to the unrecorded track (S9).

Figure 4:
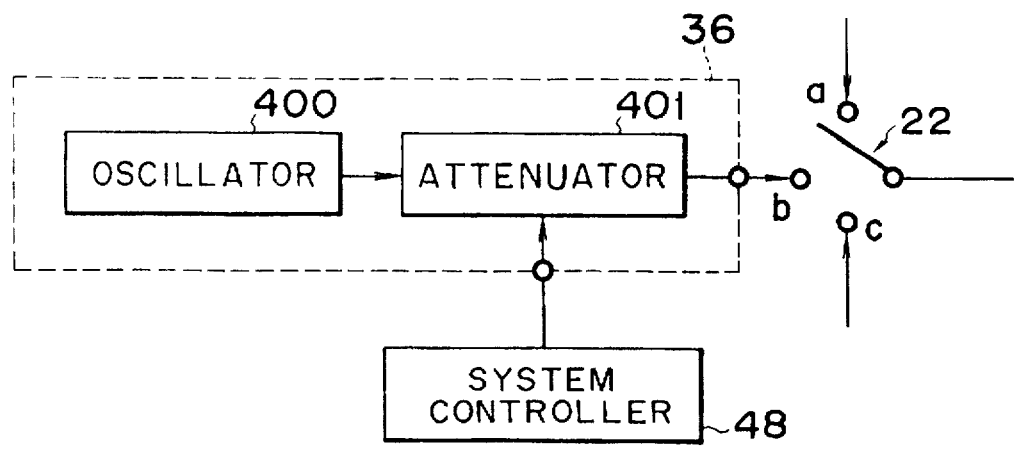
FIG. 4 is a diagram showing an example of a construction of an erasing circuit 36 corresponding to FIG. 3.
Figure 5A:
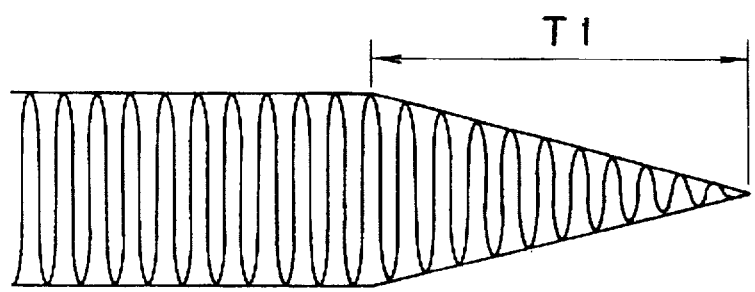
FIGS. 5A and 5B are waveform diagrams of erasing signals.
Figure 5B:
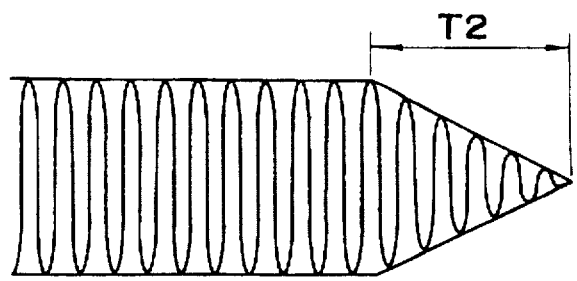

FIG. 4 shows an example of the erasing circuit 36. Reference numeral 400 denotes an oscillator to generate the erasing signal. Reference numeral 401 indicates an attenuator to attenuate the signal which is output from the oscillator 400. The attenuation amount can be controlled by switching a time constant of a time constant circuit (circuit to form periods $T_1$ and $T_2$ in FIG. 5) in the attenuator by a well-known method, for instance, by switching a resistance of the time constant circuit by the system controller 48. FIGS. 5A and 5B are diagrams showing examples of waveforms of the erasing signals which are output from the erasing circuit 36. FIG. 5A shows an ordinary attenuation wave (first attenuation wave). FIG. 5B shows a second attenuation wave of an attenuation amount larger than the first attenuation wave of FIG. 5A. As mentioned above, the time and erasing current can be also saved even by applying to the unrecorded block an erasing current smaller than that applied to the recorded block.

Figure 6B:
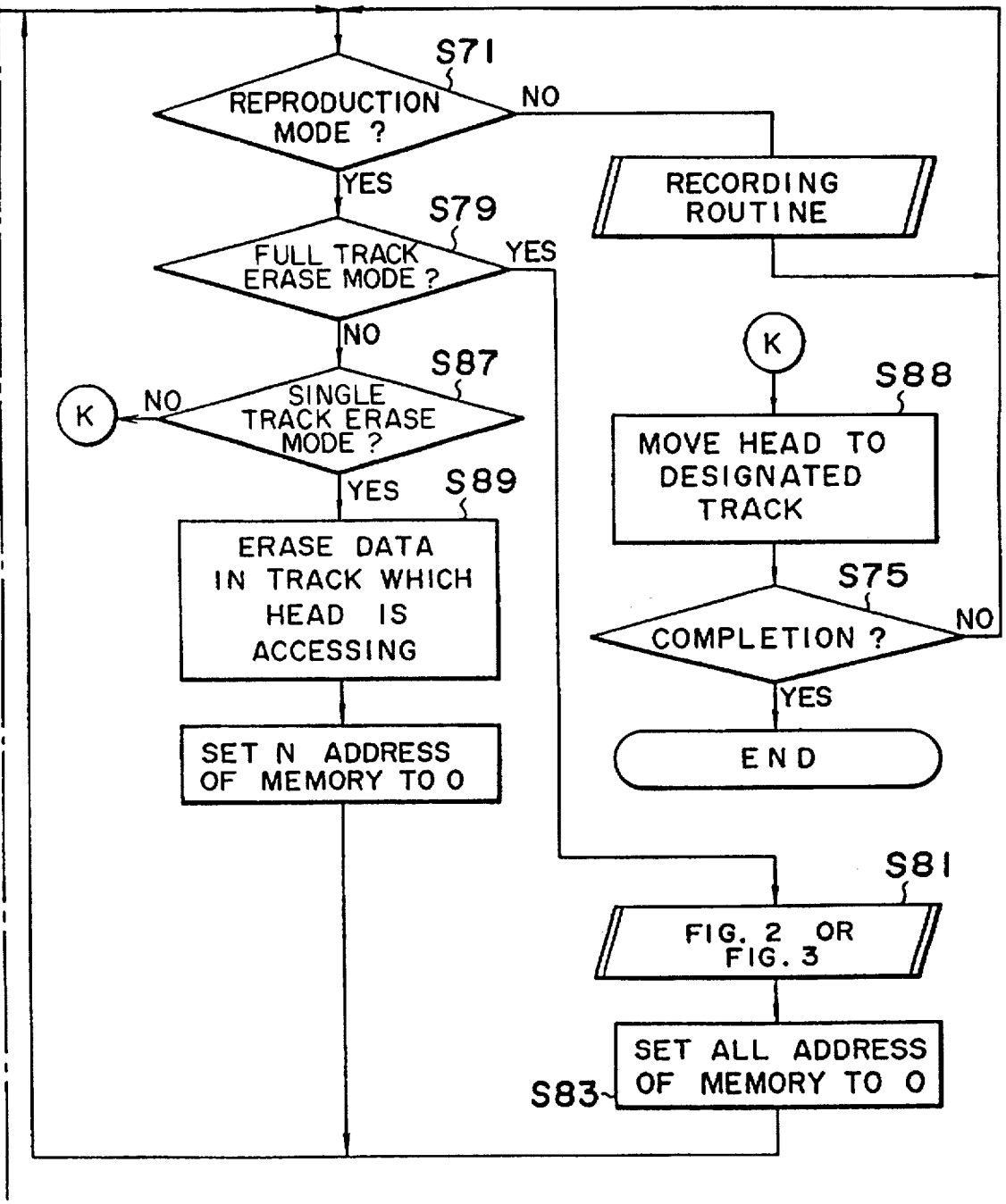

Explanation will now be made with reference to FIG. 6 with respect to the operation of the device when the presence or absence of the recorded signal of each track is detected when the magnetic disk 24 is loaded.

When the power source of the device is turned on and the operation is started, a check is first made to see if the jacket in which the magnetic disk is enclosed has been loaded into the device or not (S51). If YES, the head 30 is moved so as to access the edge of the recording region on the medium, for instance, the first track (S53). The number N to access each address in the memory is set to "1". Then, a check is made to see if the signal has already been recorded in the track which is being accessed by the head or not (S55). If the track has the recorded signal, "1" is set into address N, in the example, address 1 in the memory in the system controller 48 (S57). If no signal is recorded in the relevant track yet, "0" is set to address 1 (S59).

A check is made to see if the above operation has been executed or not with respect to the whole recording region on the medium, for instance, all of the tracks (S61). If NO, N is increased by "1" (S63). If YES in step S61, the processing routine advances to step S71.

A check is then made to see if the reproduction mode has been set or not (S71). If NO, this means that the recording mode has been set, so that the recording routine is executed. If YES in step S71, a check is made to see if the full track erase mode has been designated by turning on all three of the BLC switch 64, mode switch 62, and pickup preparation switch 50 (S79). If YES, the processing routine shown in FIGS. 3 or 2 is executed (S81). "0" is set into all of the addresses in the memory (S83). If NO in step S79, a check is then made to see if the single track erase mode has been designated by turning on only the two switches BLC switch 64 and pickup preparation switch 50 (S87). If YES in step S87, the track which is being accessed by the head is erased (S89). Upon such an erasing operation, as shown in steps S4 and S9 in FIGS. 2 and 3, the erasure is not performed or the process to erase with a smaller erasing energy as shown in, e.g., FIG. 5B is not executed but the process as shown in FIG. 5A is executed. Due to this, with respect to the designated track, the proper erasing process can be uniformly executed. Therefore, for instance, even if a portion which could not be erased remains due to some inconveniences when the erasing was performed by a small erasing energy as shown in step S9 in the flowcharts of FIGS. 2 and 3, such an unerased portion can be erased by erasing the designated track.

In the embodiment, the still video floppy is used as a recording medium and the track corresponds to the recording block. However, as such a recording medium, it is also possible to use a tape-shaped recording medium, an optical recording medium, or a solid-state memory such as a semiconductor memory or the like. In the case of using such a medium, the track or sector of the medium or the memory area in the solid-state memory corresponds to the recording block. On the other hand, it is also possible to use a recording medium of information such as an audio signal other than the image signal.

As will be easily understood from the above description, according to the embodiment, by controlling the erasing circuit by the unrecorded recording block and the recorded recording block, for instance, the erasing operation is executed to only the recorded recording block, so that the time and electric power consumption which are necessary to erase can be saved.

What is claimed is:

1. An information signal erasing apparatus, comprising:

instruction means, comprising a plurality of operating members which include a recording area designation operating member for designating a particular recording area from among a plurality of recording areas formed on a recording medium, for providing operating instructions to said information signal erasing apparatus by operating each of the plurality of operating members;

discriminating means for discriminating whether an information signal is recorded on each of the recording areas of the recording medium and for producing a discrimination result;

erasing means for erasing an information signal recorded on each of the recording areas of the recording medium, said erasing means having a first erasing mode for executing a first erasing operation and a second erasing mode for executing a second erasing operation, which consumes less power than that consumed in the first erasing mode; and erasing operation control means for causing said erasing means to execute (i) an operation for erasing a recording area, designated by said recording area designation operating member, from among the plurality of recording areas formed on the recording medium, according to the first erasing operation in the first erasing mode, when an instruction for erasing an arbitrary recording area in the plurality of recording areas formed in the recording medium is executed by operating a second number, which is less than a first number, of predetermined operating members, from among the plurality of operating members of said instruction means, and (ii) an erasing operation corresponding to the first erasing operation for a recording area in which said discriminating means determines that an information signal has been recorded and to execute an erasing operation corresponding to the second erasing operation for a recording area in which said discriminating means determines that an information signal has not been recorded when an instruction for erasing all recording areas of the recording medium is executed by operating the first number of predetermined operating members from among the plurality of operating members of said instruction means substantially at the same time.

2. An apparatus according to claim 1, wherein the recording medium comprises a disc.

3. An apparatus according to claim 1, further comprising reproducing means for reproducing an information signal recorded on the recording medium.

4. An apparatus according to claim 1, wherein the recording medium comprises a magnetic recording medium on which recording tracks are formed as the recording areas.

5. An apparatus according to claim 4, wherein said erasing operation control means comprises a magnetic head and applies a magnetic field to the recording medium by supplying an electrical signal of a predetermined frequency.

* * * * *

UNITED STATES PATENT AND TRADEMARK OFFICE
CERTIFICATE OF CORRECTION

PATENT NO.   :   5,760,985

DATED        :   RYOJI KUBO

INVENTOR(S)  :   June 2, 1998

It is certified that error appears in the above-identified patent and that said Letters Patent is hereby corrected as shown below:

<u>COLUMN 4</u>:

line 12, "FIG. 5)" should read --FIGS. 5A and 5B)--; and line 21, "can be also" should read --also can be--.

Signed and Sealed this

First Day of December, 1998

Attest:

BRUCE LEHMAN

*Attesting Officer*       *Commissioner of Patents and Trademarks*